US008077877B1

United States Patent
Martin et al.

(10) Patent No.: US 8,077,877 B1
(45) Date of Patent: Dec. 13, 2011

(54) COURTESY ANNOUNCEMENT SYSTEM AND METHOD OF USING

(75) Inventors: Hardison G. Martin, Louisville, KY (US); Kenneth A. Tench, Louisville, KY (US); Jody W. Green, Louisville, KY (US)

(73) Assignee: Mitek Corp., Inc., Phoenix, AZ (US)

( * ) Notice: Subject to any disclaimer, the term of this patent is extended or adjusted under 35 U.S.C. 154(b) by 1330 days.

(21) Appl. No.: 11/230,296

(22) Filed: Sep. 19, 2005

Related U.S. Application Data (63) Continuation-in-part of application No. 10/066,420, filed on Jan. 31, 2002, now Pat. No. 7,694,325.

(60) Provisional application No. 60/611,131, filed on Sep. 18, 2004.

(51) Int. Cl.
*H04R 27/00* (2006.01)
*H04N 7/16* (2006.01)
*G06F 3/00* (2006.01)

(52) U.S. Cl. .......... 381/82; 725/143; 725/145; 715/730; 715/731; 379/37; 455/3.01

(58) Field of Classification Search .................... 381/82; 725/143, 145; 715/730, 731; 379/37; 455/3.01
See application file for complete search history.

(56) References Cited

U.S. PATENT DOCUMENTS

| | | | | |
|---|---|---|---|---|
| 4,701,862 A | * | 10/1987 | Washizuka et al. | 704/274 |
| 5,801,685 A | * | 9/1998 | Miller et al. | 715/202 |
| 6,385,568 B1 | * | 5/2002 | Brandon et al. | 704/7 |
| 6,714,909 B1 | * | 3/2004 | Gibbon et al. | 704/246 |
| 2001/0026623 A1 | * | 10/2001 | Erwin | 381/82 |
| 2003/0143944 A1 | * | 7/2003 | Martin et al. | 455/3.01 |
| 2004/0240679 A1 | * | 12/2004 | Kennedy et al. | 381/82 |

* cited by examiner

*Primary Examiner* — Vivian Chin
*Assistant Examiner* — Paul Kim
(74) *Attorney, Agent, or Firm* — Keith L. Jenkins, Registered Patent Attorney, LLC; Keith L. Jenkins (57) ABSTRACT

A courtesy announcement system and method for broadcasting messages audially and visually having a central database server connected to operator workstation computers. Announcements stored and maintained in the database server can be accessed, viewed, modified, and replayed by any of a plurality of operators located at the workstation computers. Operators receive and construct announcements to be broadcast using announcement templates and the broadcasts can be multi-lingual even if the operator is not multi-lingual. Announcement templates includes pre-translated variables, and optional announcement delivery settings permit the operator to conduct the destination of the announcements, when the announcement should be broadcast, and start times for broadcast, among other settings.

30 Claims, 3 Drawing Sheets

COURTESY ANNOUNCEMENT SYSTEM AND METHOD OF USING

This continuation-in-part application claims priority from U.S. patent application Ser. No. 10/066,420 entitled INFORMATION BROADCASTING SYSTEM, to Martin et al., filed Jan. 31, 2002 now U.S. Pat. No. 7,694,325.

This application claims the benefit of provisional U.S. application 60/611,131, filed Sep. 18, 2004, for a courtesy announcement system.

BACKGROUND

Publicly accessible areas are often equipped with broadcasting systems having both audio and video components for disseminating information to the general public. For example, museums, shopping centers, train stations, bus stations, airports, and even grocery stores now have video, displays and accompanying audio systems that not only inform those nearby, but also present advertising banners or the like. In transportation centers, automated video displays and audio announcements are a necessity for informing travelers of arrival and departure times, paging messages, emergency announcements, gate or terminal changes, and a host of other messages necessary to facilitate efficient travel.

Prior art systems for generating and displaying audio and video messages often rely on "off the rack" audio and video controllers to generate and send signals to various broadcast and display devices. For example, airports are equipped with numerous video displays that display flight numbers, departure and arrival gates, schedules, and the current time. Many of these prior art video systems are equipped with complementary audio systems that broadcast messages of import to an area or zone within the airport terminal.

When a flight schedule is modified, a video display device displaying information for multiple flights will often simply change the affected flight information on the display. Often, a concomitant audio announcement is made to inform passengers that a particular flight has been affected. Additionally, in many cases courtesy and emergency announcements or messages are broadcast only through the audio portion of the system, as most display systems are not equipped to visually display courtesy announcements. This is a particularly vexing problem for hearing-impaired patrons, as they are extremely difficult or even impossible to reach by page, even in emergency situations.

Additionally, attempts to reach a patron or passenger by broadcasting an audio announcement often fail because the person being paged is simply not listening or is located in an area not covered by a speaker system. Prior art systems do not provide the ability to replay pages, or to play multiple pages in a single batch. Furthermore, most prior art systems do not have the capability to determine past paging or announcement events.

SUMMARY OF THE INVENTION

The instant invention overcomes the aforementioned problems by providing a system and method for broadcasting audio information having a central database server connected to a plurality of operator workstation computers and linked by a digital communications network to an audio broadcast system having a plurality of audio speakers capable of broadcasting audible information throughout a given facility. A plurality of speakers or other sound reproduction devices are connected to an audio controller for broadcasting audio messages to a plurality of locations, or even to a plurality of pre-defined broadcast zones within a locale.

The system workstations comprise a graphical user interface (GUI) run on a conventional microcomputer having a visual display to assemble customized announcement messages that may be broadcast both audibly and visually. The messages are initiated by a user (e.g., an operator) by typing a message into a dialog box using a conventional keyboard or other operator interface as an input to the microcomputer, then recording a concomitant audio message using a microphone input to the microcomputer. Announcement messages can also be generated by typing the text thereof using a conventional microcomputer and keyboard and processing the typed messages through a text-to-speech (TTS) converter.

Furthermore, the instant invention may employ a plurality of loudspeakers and visual displays that may be addressed either separately or in specified broadcast groupings, thereby allowing messages to be broadcast in a plurality of broadcast zones throughout a given coverage area. In this fashion, messages can be played locally or in widespread areas depending upon the users' preferences.

The instant invention provides for the production of a log of all audio announcements maintained in an announcement system database server, thereby providing an operator the ability to access, view, alter, and replay past messages quickly and easily. The database server, or a plurality thereof, stores all announcement information for each announcement message that is input into the system via a plurality of announcement system workstations. This information includes message content, time when broadcast, number of broadcasts, etc. This feature of the instant invention also allows the user of the system to customize the information stored about the announcements thereby making it particularly suitable for use in, for example, an airport or train station where information must be conveyed to a plurality of concourses, platforms, gates, or terminals. In addition, the operator may store information such as the name of the caller who requested the courtesy announcement and a message to be delivered privately to the person being contacted, when that person calls into the call center to retrieve the message. Since this information is shared among all workstations via the database server, any operator can initiate the courtesy announcement and any other operator, not just the one who took the original request call, can retrieve and read back the private message for the recipient when he calls in for it. The database also records when a private message is delivered to the recipient.

Furthermore, the system of the instant invention provides a user with the ability to access the announcement information stored in the database server from the plurality of workstation locations throughout the broadcast area thereby permitting an operator to confirm that a party was indeed paged, or that a message was broadcast. This feature of the instant invention allows a facility to confirm to patrons that their message has indeed been broadcast. Since any information that is broadcast using the present invention is stored in a log in the database server, a user may readily track, store, and retrieve previously broadcast messages and regularly update the information contained in the database.

The system also includes a feature that allows for automated batching of paging announcements that is particularly advantageous in the travel industry when boarding planes, buses, trains and the like. An agent or user simply initiates the announcement message, for example, a page for a passenger to pick up a courtesy phone, and the system of the instant invention will broadcast the announcement a predetermined number of times by itself, thence broadcast the announcement in conjunction with other similar announcements a predetermined number of times prior to removing the announcement from broadcast.

The system supports multi-language announcements by storing translations for the announcement templates as well as variables that are commonly used to complete the announcement, such as meeting locations, items commonly left at the security checkpoint, etc. The operator may select which of the available languages to play the public announcement in via simple keyboard or mouse operations.

The system also includes options for printing out logs of announcements played and private messages delivered, as well as printouts of announcement templates and message variables, and their translations into various languages.

Therefore, it is an object of the present invention to provide a system and method for broadcasting audible and visual information.

It is a further object of the instant invention to allow a user or operator to construct a plurality of messages to be broadcast audibly using a text to speech converter without requiring an audio recording thereof.

It is a further object of the instant invention to create and broadcast a plurality of audio messages that may be batched or grouped according to subject matter.

It is a further object of the instant invention to provide for synchronous broadcast of both audio and visual information in a plurality of areas simultaneously in order to maximize its reception and understanding by the general public, regardless of hearing or sight limitations.

It is a further object of the instant invention to provide a courtesy announcement message log that records the time and content of all announcements broadcast.

It is a further object of the instant invention to provide a user the ability to access and modify an announcement database that supplies information to both an audio and visual broadcast system, as well as information such as the name of the caller and the private message to be delivered.

It is a further object of the instant invention to provide for multi-lingual announcement capabilities, even if the operator is not bi-/multi-lingual himself.

Other objects and advantages of the instant invention will be apparent after reading the detailed description of the preferred embodiments, taken in conjunction with the accompanying drawing figures.

The instant invention is a courtesy announcement system having an announcement system database server for assembling and for storing an announcement log and the announcement log is comprised of a plurality of announcements. The courtesy announcement system further has at least one operator workstation electrically connected to the announcement system database server for inputting, accessing, editing, and replaying each of said announcements, and an audio reproduction device, such as a speaker, for an audio broadcast of the announcements from the announcement log. Each announcement is formulated by selecting one of a plurality of announcement templates and inputting information as required by the selected template. The operator workstations can be personal computers.

In an embodiment, the courtesy announcement system is comprised of an audio message output connected to an audio controller. The audio control provides a plurality of audio output signals to the audio reproduction device In another embodiment, the announcement system database server is comprised of an audio message output connected to an audio controller. The audio controller provides a plurality of audio output signals to the audio reproduction device.

In yet another embodiment, the announcement system database server is comprised of an extensible markup language (XML) output for transmitting announcements to alternative display devices. The alternative display devices can be visual displays broadcast simultaneously and in synchronization with the audio reproduction device.

In yet another embodiment of the instant invention, a communications network electrically connects the operator workstations to the announcement system database server.

In yet another embodiment of the instant invention, the announcement template can be "Pickup a Courtesy Phone," "Item Left at Security," "Standby Passenger See Agent," "Meet Your Party," and an individually created template as written by the system administrator.

In yet another embodiment of the instant invention, the announcement template is comprised of modifiable variables and delivery settings. The variables can be pre-translated into multiple foreign languages. The delivery settings are comprised of an announcement destination, announcement frequency, announcement start time, and broadcast zone.

In another embodiment of the instant invention, the audio broadcast is a recorded voice announcement.

In still yet another embodiment of the instant invention, the audio broadcast is a text-to-speech announcement.

The present invention is a courtesy announcement system comprising a central database server for storing an announcement log and the announcement log includes at least one announcement. Further, the courtesy announcement system has at least one operator workstation connected to the central database server for entering the announcement and an audio reproduction device, such as at least one speaker, for broadcasting the announcement. The courtesy announcement system further has an announcement template, and the announcement template is comprised of a courtesy announcement, announcement content, modifiable variables, and modifiable delivery settings. The announcement is defined by the announcement template.

In another embodiment of the present invention, the operator workstation is a personal computer having a web-based graphical user interface.

In yet another embodiment of the present invention, the database server is comprised of an audio controller for providing audio message output to the audio reproduction device.

In yet another embodiment of the present invention, the database server is comprised of an extensible markup language output for transmitting announcements for display on a video system. The audio reproduction device and the video system broadcast announcements simultaneously and in synchronization.

In yet another embodiment of the present invention, the announcement template and modifiable variables are pre-translated into multiple foreign languages.

In yet another embodiment of the present invention, the modifiable delivery settings include an announcement destination, frequency of announcement, time of announcement, length of time between announcement play, start time of announcement, and languages of announcement.

In yet another embodiment of the present invention, a microphone is connected to the operator workstation for vocally recording announcements.

In yet another embodiment of the present invention, the central database server includes a text-to-speech converter (TTS).

In yet another embodiment of the present invention, the central database server includes a bad language warning filter.

In yet another embodiment of the present invention, the announcement template has a batch message option for batching and broadcasting identical announcements for a plurality of recipients.

In still yet another embodiment of the present invention, the central database server is further comprised of a list of pending (i.e. current) announcements.

The instant invention is a method for broadcasting courtesy announcements comprising the steps of accessing an announcement system database server at an operator workstation connected with the announcement system database server, entering a request for an announcement into an announcement template at the operator workstation, storing the announcement in an announcement log in the announcement system database server, and broadcasting the announcement stored in the announcement system database server as defined by the announcement template.

In another embodiment of the instant invention, the step of accessing the announcement system database server includes an operator logging into the announcement system using a user id and password.

In yet another embodiment of the instant invention, the announcement template includes commonly used phrases in multiple languages.

In yet another embodiment of the instant invention, the step of entering a request into the announcement template further includes selecting a courtesy announcement.

In yet another embodiment of the instant invention, the step of enter a request into the announcement template includes selecting announcement content. The operator may select an option to batch the announcements containing identical announcement content. Announcement content can include a message, modifiable variables, and modifiable delivery settings. The modifiable variables can be translated into multiple foreign languages and. The delivery settings can include an announcement destination, announcement frequency, announcement start time, and broadcast zones In yet another embodiment of the instant invention, the operator can create an new announcement template before entering a request for a new announcement.

In yet another embodiment of the instant invention, the operator can select an announcement type before broadcasting the announcement. The announcement type can be a voice recorded announcement or a text-to-speech announcement.

In yet another embodiment of the instant invention, the operator can read and record the voice recorded announcement.

In yet another embodiment of the instant invention, the method further includes the step of accessing the announcements stored in the announcement log. After accessing the announcements stored in the announcement log, the operator can review and/or modify the announcement.

In yet another embodiment of the instant invention, the request for an announcement may be a request for a new announcement, a request to replay an announcement that has already been broadcast, or a request from an intended recipient to pick up a message.

In yet another embodiment of the instant invention, broadcasting the announcements includes playing the announcements on audio reproduction devices and visual displays simultaneously and in synchronization.

In yet another embodiment of the instant invention, announcements are broadcast until they are delivered to the intended recipient In yet another embodiment of the instant invention, the method further includes a filtration of bad language via a bad language warning filter In yet another embodiment of the instant invention, the method includes the step of accessing an announcement from a list of pending announcements. The announcement can be replayed, modified and replayed, or a private message as stated in the announcement template is transmitted to an intended recipient.

DETAILED DESCRIPTION OF THE PREFERRED EMBODIMENT

Figure 1:
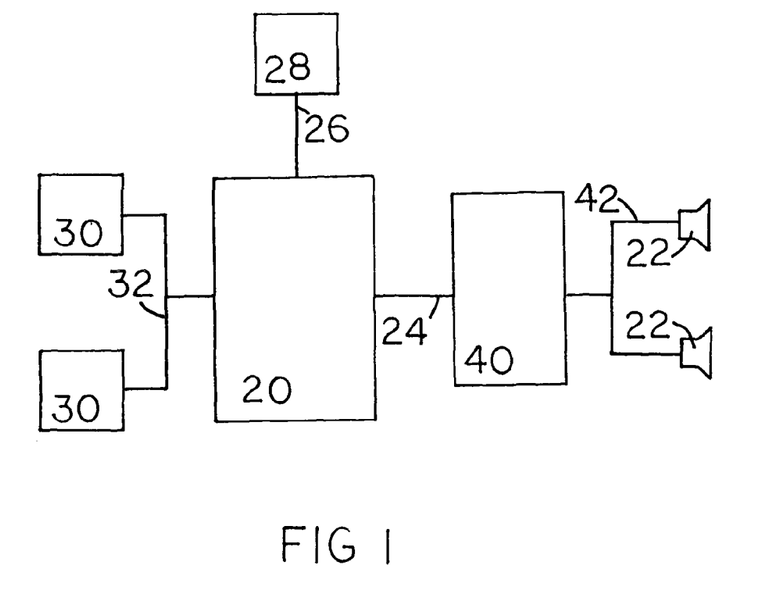
FIG. 1 is a block diagram of the system of the instant invention.

Referring to drawing FIG. 1, and in accordance with a preferred constructed embodiment of the instant invention, a system 10 for broadcasting audio announcements comprises an announcement system database server 20 for assembling and storing announcements to be broadcast to at least one speaker 22 or other audio reproduction device. A plurality of speakers 22 can be placed throughout a facility in order to broadcast messages to a plurality of discrete locations or rooms, as is well known to one of ordinary skill in the art. While the examples referred to throughout this specification will be tailored to the use of the present invention in an airport environment, one of ordinary skill will recognize that the present invention may be practiced wherever it is desirable to broadcast audio announcements.

A plurality of operator workstations 30 are electrically connected to the database server 20 via a communications network 32, for example an Ethernet network or any one of a wide variety of commercially available communications networks. The workstations 30 may comprise a conventional personal computer having a microprocessor, a memory, a visual display, and an operator interface, or a plurality thereof such as a keyboard and a mouse. The workstations 30 are capable of running conventional web-based browser software such as Internet Explorer® or a similar program. The present invention 10 is intended for use in a web browser environment, for example, running on a standard Microsoft Windows® equipped workstation 30.

The database server 20 includes an audio message output 24, typically a conventional audio line out, that is provided to a commercially available audio controller 40, for example an ACS system or IED 8000 system, both available from Innovative Electronic Designs, Inc. of Louisville, Ky. The audio controller 40 provides a plurality of audio output signals 42 representative of the audio broadcast messages to the plurality of speakers 22. Furthermore, the database server 20 has an XML output 26 that permits XML (extensible markup language) data to be transmitted out to alternative display devices 28, for example a visual display or a plurality thereof. This feature of the present invention permits an audio announcement to be converted to a concomitant video announcement that is transmitted for display to a video system. Furthermore, the use of an XML output enables the receiving device to simply display the output provided, without additional processing, since the output format is included in the XML file.

The present invention 10 provides a web-based graphical user interface (GUI) on the plurality of workstations 30. The database server 20 employs a relational database structure for all data tables stored therein to provide for compatibility with a wide variety of legacy systems. Authorized users or "operators" located at the workstations 30 login to the courtesy announcement system with a username and password. Now referring to the flow chart of FIGS. 2a and 2b, an operator, who may be one of many operators, receives a call 212 which can come from a variety of sources, including, but not limited to, airport patrons or airport employees. The calls can be requests for new announcements 214, requests to replay announcements 216 that have already been processed and broadcast, or requests to pick up an announced message 222. Other calls 260 are outside the scope of this system 10.

Figure 2A:
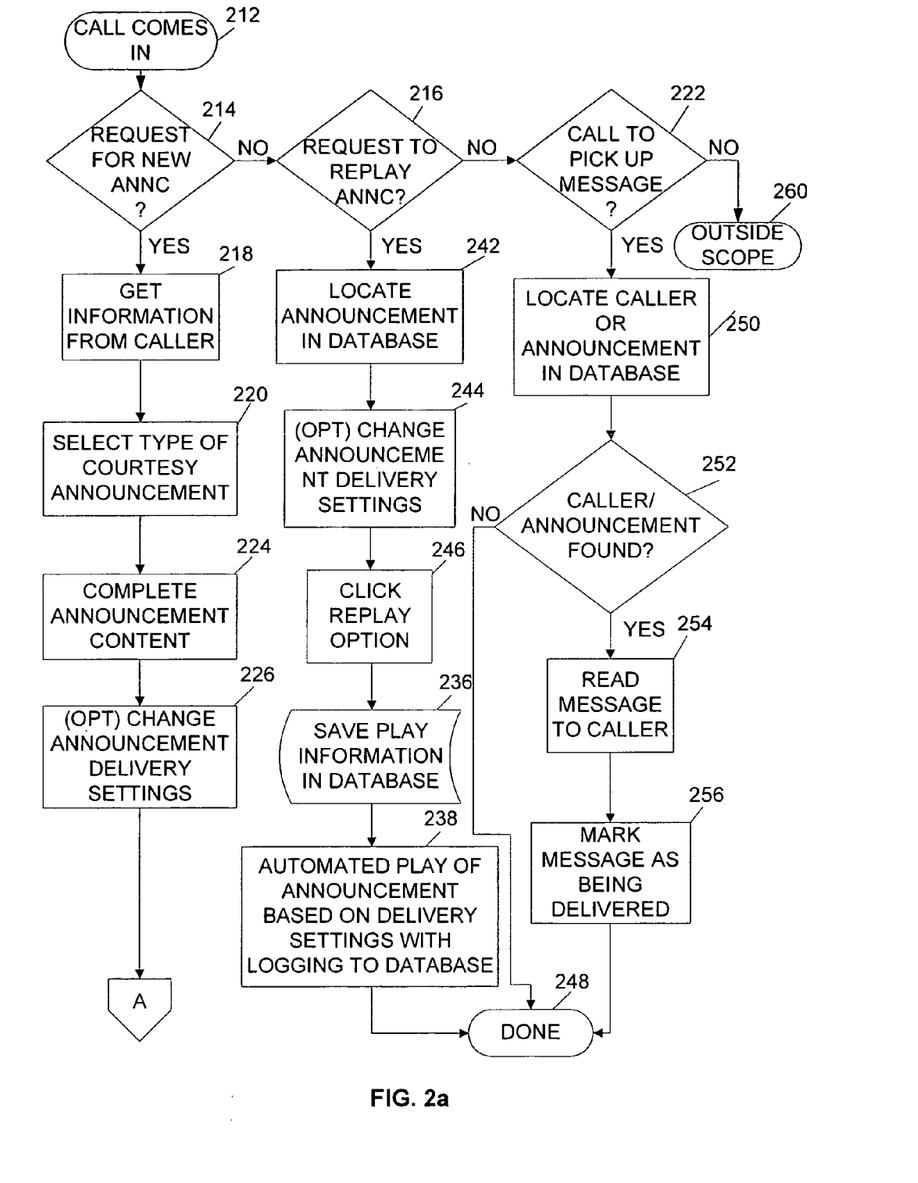
FIGS. 2a and 2b are flow charts showing the process of the system in accordance with one embodiment of the present invention.

When a new announcement 214 has been, requested, the operator will access the appropriate icon for a "new announcement" from the GUI, and obtain information from the caller 218, such as, but not limited to, the name of the caller, the name of the recipient of the message, and the message to be broadcast. The GUI provides an announcement template dialog box that permits an operator to construct the message to be broadcast. The operator will select, from a pull down menu, the type of courtesy announcement 220 from a plurality of announcement templates, including, but not limited to, "Pickup a Courtesy Phone," "Item Left at Security," "Meet Your Party," "Standby Passenger See Agent," or other individually created announcements templates as defined or written by the system administrator or head operator. Once an announcement template is selected 220, the GUI then permits the operator to select the announcement content 224 associated with the particular type of courtesy announcement 220 including the person leaving the message and the message which will be read to the person paged, and/or modify variables within the selected template. Examples of variables that may be modified include: name of recipient, Mr./Mrs./Dr., name of originator, airline, gate, urgency level, type of item left, or location to meet a party. If applicable, the operator can quickly select items left at a security checkpoint or elsewhere, including, but not limited to, a briefcase, a cell phone, a wallet, a set of keys, a purse, a carry-on bag, a jacket, a child, a laptop computer, and/or a backpack. This enables a plurality of different message types to be quickly assembled. Also, the variables are pre-translated into languages that can be selected by the operator.

The operator will also fill in optional announcement delivery settings 226, including, but not limited to, the "destination" of the announcement, frequency of play, the length of time between plays, start time for plays, languages, and when the messages are to be played. Also, other variables may be added to the announcement templates as needed by an operator. For example, in a hospital announcement setting, the various broadcast zones may include emergency rooms, intensive care units, waiting rooms, etc., while message recipients may include a Doctor, Nurse, Orderly, etc. Again, the variables are pre-translated into languages that can be selected by the operator.

Furthermore, the present invention permits the user to construct additional announcement templates via a template management dialogue box when necessary to address recurring announcement requirements. For example, an operator may realize that they are creating multiple messages requesting passengers to report to the baggage claim area and simply construct a template including the message: "Will [name] please report to the baggage claim area." This feature of the present invention provides great flexibility for using the system in a wide variety of applications.

After the announcement template, message for recipient, and announcement settings are completed, the operator then selects for the announcement type 228 to record and read the announcement or to use the automatic text-to-speech feature.

The operator can click the "record voice announcement" icon and vocally (i.e., verbally) record the audio message 230 by reading the text message back into a microphone that is electrically connected to a suitable audio input on the workstation 30. The message may be recorded in any language or languages necessary, given the convention at the broadcast location. The operator can then optionally choose to re-record 232 the audio message, and then play the message 234 to be broadcast. The recorded audio message 230 and announcement can be entered, assembled and saved (i.e., recorded) as an audio file for later broadcast.

In an alternative embodiment of the present invention, instead of voice-recording an announcement 230, the operator may type specific message text into the message dialog box then click 240 the "text-to-speech announcement" icon, whereupon the workstation launches a commercially available text to speech (TTS) converter program to transform the typed message into an audio message constructed by the TTS program. The operator will be able to preview the announcement in another web-based dialogue box in one or more languages prior to "sending" the message. A wide variety of commercially available text to speech converters may be employed in this embodiment of the invention, as is well known to one of ordinary skill in the art. The TTS tasks are handled within the database server 20. This embodiment of the present invention is particularly advantageous for applications where multiple languages are used, for example international airports, since the TTS converter obviates the need for an operator who is proficient in each language required. Furthermore, the announcement templates may contain commonly used phrases in multiple languages where necessary. One of ordinary skill in the art will recognize that virtually any language may be used with the system of the present invention.

The present invention includes features that store records of each announcement message created by the operators on the announcement system database server 20. This announcement log 236 permits a master operator or supervisor to review the message log to determine a plurality of message variables, including, but not limited to, the operator who created the message, the operator who delivered the message, the name of the person requesting the message, the time the message was requested, the message content, recipient, the date and times the announcement was broadcast, the total number of times broadcast, the areas or broadcast zones to which the message was sent, the status of the announcements, any private message to be delivered to the recipient, and the urgency of the message. This feature of the present invention is advantageous when message recipients miss a broadcast announcement, when a requester calls to make sure the message was broadcast, or when the intended recipient calls in to retrieve his message. The supervisor can simply peruse the message log using a workstation 30 to determine all of the recorded parameters for each message created by the system of the present invention. This feature also allows the master operator or supervisor to print an announcement and all its associated information.

Finally, the information from the audio recorded 230 and/or TTS announcements 240 can then be saved (i.e., stored) 236 in the announcement database server 20 and then broadcast (i.e., played or announced) 238 the selected number of times (as chosen in the announcement delivery settings 226) or until the message has been delivered to the intended recipient. The visual and audio (either voice recorded or the TTS announcement) broadcast can be seen and/or heard at appropriate locations selected by the operator when choosing the delivery settings 226. The visual and audio broadcasts occur simultaneously and are preferably synchronized. In other words, the scrolling speed of the visual broadcast is adjusted automatically based on the audio length of the message.

The present invention also includes a "bad language" warning filter feature that notifies an operator prior to the operator broadcasting a message including any improper language. A dictionary of curse, slang and gag words and phrases (in all necessary languages) is provided in the database server 20. Once the message is created (or even during message creation) the system scans the entered text and compares it to the slang dictionary and provides a visual and/or audible alert to the operator when a match is found. The operator may not be permitted to proceed with recording or converting the message (in TTS systems) when a match exists. Furthermore, whenever a match is found, the system logs the message for future reference. The filter of the present invention scans for single words and combinations, such as the first and last name combined of a message recipient, or any other two (or more) variables that are adjacent one another in the selected message template.

The present invention also provides an easy interface for accessing the text-to-speech engine's pronunciation dictionary. The pronunciation allows for exact phonetic description of how to pronounce commonly occurring words and abbreviations as they pertain to the particular installation and locale (e.g., whether "Dr." should be pronounced as Drive or Doctor). Since the specifics of these dictionaries may vary from product to product, a common and easy interface for the system user is desirable.

The present invention also has the capability to provide announcement batching wherein all names of individuals for which the same type of message is waiting to be broadcast are combined into one announcement once the message begins to be repeatedly broadcast. For example, where the batched message to be broadcast is "Paging (name), please pick up a white courtesy phone," a plurality of names can be placed together in the message and simply broadcast together: "Paging John Smith, Bill Jones, and Michael Jordan, please pick up a white courtesy phone." Whether a specific message can be included in a batched play broadcast is selectable by the operator via a pull down menu or button in the announcement template window. Where this feature is not selected, the announcement will not be batched.

The first time an announcement is played it will preferably be broadcast un-batched, i.e., by itself. Immediately after the operator completes the message and presses a save or send button, the message plays by itself (provided a delayed broadcast time has not been selected in the template). This feature of the present invention permits operators the aural feedback that an announcement is being properly broadcast throughout the system. For any future repeats of this announcement (again, where selected in the announcement template) the system of the present invention adds the announcement recipient's name to a batch list for that batch announcement, along with the number of times that specific recipient should be included in the batch message broadcast, before being dropped off the batch list.

Figure 2B:
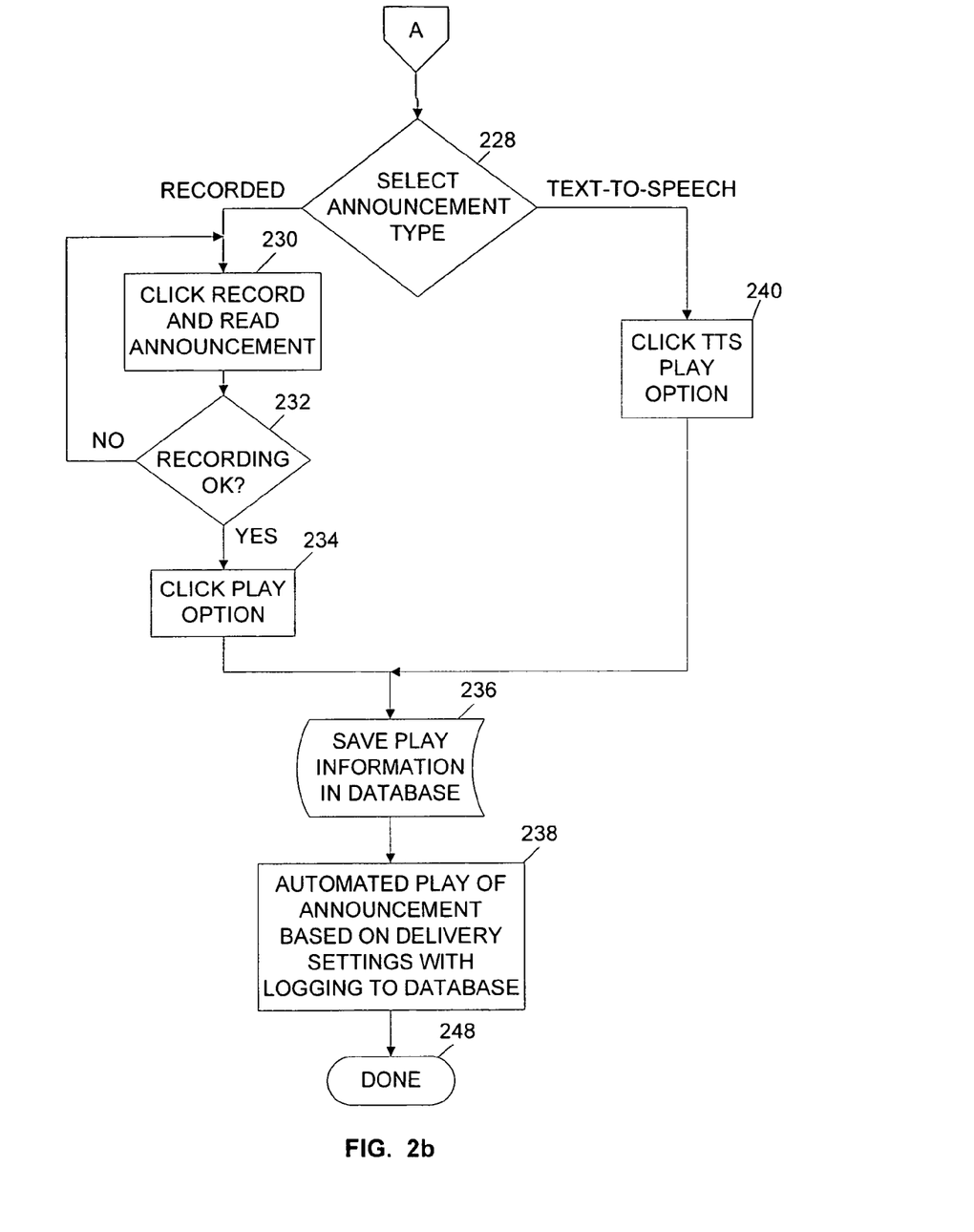

A "current announcement" feature can also be used to retrieve announcements for replay 216 or to deliver a private message to the recipient when he calls in to the call center to pick up a message 222. Because all messages are stored on the common database server 20, any operator can deliver the private message, not just the operator who took the original request call. A list of current (i.e., pending) announcements includes the name of the intended message recipient, when the message transmission started, the template for the intended recipient, and the status of the message broadcast (e.g., waiting, active, completed, or failed).

If a call comes in for a request for a particular announcement to be replayed 216, the operator locates 242 the relevant announcement that had been entered into the announcement system database server 20 from the list of current announcements. The operator locates (i.e., accesses) 242 the appropriate current announcement associated with the previously entered announcement and change the announcement settings 244, if requested. For example, a call may come in from an airport employee requesting an announcement be replayed that John Doe forgot his cell phone at a security checkpoint. The airport employee may learn from an unspecified source that the recipient of the message is actually French and understands little English. The operator can then replay 246 the announcement with new announcement settings which include a broadcast in French. The operator will then select the replay option 246 so that the message will be broadcast again, but this time in French. As another example, the airport employee may learn that the recipient of the message actually forgot his laptop computer. The operator can then select the replay announcement option 246 with new announcement settings which makes a broadcast including the laptop computer. The edited play information is saved 236 in the announcement system 20 database server and then broadcast 238.

A call may come also in from the intended recipient of a broadcasted announcement to actually pick up 222 his message that has already been stored in the list of current announcements in the announcement system database server 20. The operator will obtain information from the caller (i.e., the intended recipient), such as his name, in order to access the appropriate announcement 250 intended for the caller from the list of current announcements in the announcement system database server 20. After the operator locates 252 the message intended for the caller, the operator will then transmit (e.g., read) 254 the message to the caller, which is, again, located in the GUI dialog box. Again, the operator that transmits the information to the caller need not be the same operator that entered the information into the new announcement template, and thus into the announcement system database server 20. After the caller retrieves his message, the operator can then mark the message as being delivered 256, the status of that particular message will change, and the change will be marked as completed in the current announcements dialogue box.

The foregoing detailed description of the preferred embodiments is considered as illustrative only of the principles of the invention. Since the instant invention is susceptible to numerous changes and modifications by those of ordinary skill in the art, the invention is not limited to the exact construction and operation shown and described, and accordingly, all such suitable changes or modifications in structure or operation which may be resorted to are intended to fall within the scope of the claimed invention.

What is claimed is:

1. A courtesy announcement system, comprising:
   a. at least one operator workstation for inputting, storing on a networked announcement database server, accessing, editing, and replaying a plurality of announcements by an operator;
   b. said networked announcement system database server networked to said at least one operator workstation and operable to store a plurality of operator-accessible, editable, and re-playable announcements, to store a plurality of operator-editable announcement templates, and to provide access to said operator-accessible, editable, and re-playable announcements and said operator-editable announcement templates to said at least one operator workstation on said network;

c. an announcement log maintained in said announcement system database server, said announcement log providing a record of said plurality of announcements previously input by an operator at said at least one operator workstation; and d. at least one audio reproduction device for at least one audio broadcast of at least one particular announcement of said plurality of announcements from said announcement system database server;

e. wherein at least one particular announcement of said plurality of announcements is formulated by an operator selecting a particular announcement template of a plurality of said announcement templates and inputting information as required by the selected particular announcement template; and f. wherein said replaying comprises replaying at least one previously broadcast announcement.

2. The courtesy announcement system of claim 1, wherein said networked announcement system database server is comprised of an audio message output connected to an audio controller, said audio controller providing a plurality of audio output signals to said at least one audio reproduction device.

3. The courtesy announcement system of claim 1, wherein said networked announcement system database server is comprised of an extensible markup language output for transmitting said announcements to alternative display devices.

4. The courtesy announcement system of claim 3, wherein said alternative display devices comprise visual displays broadcast simultaneously and in synchronization with said audio reproduction devices.

5. The courtesy announcement system of claim 1, wherein said announcement template is selected from the group consisting of "Pickup a Courtesy Phone," "Item Left at Security," "Standby Passenger See Agent;" "Meet Your Party," and an individually created template.

6. The courtesy announcement system of claim 1, wherein said announcement template is comprised of modifiable variables and delivery settings.

7. The courtesy announcement system of claim 1, wherein said audio broadcast comprises a recorded voice announcement.

8. The courtesy announcement system of claim 1, wherein said audio broadcast comprises a text-to-speech announcement.

9. A courtesy announcement system, comprising:

a. a central networked announcement database server maintaining an announcement log, said announcement log for storing a plurality of announcements;

b. at least one operator workstation connected to said central networked announcement database server for entering said plurality of announcements into said announcement log and for accessing, viewing, altering, and replaying operator-selected announcements of said plurality of announcements stored in said announcement log, wherein said replaying comprises replaying at least one previously broadcast announcement;

c. at least one audio reproduction device for broadcasting said operator-selected announcement; and d. at least one operator-editable announcement template, said at least one announcement template comprised of a courtesy announcement, announcement content, operator-modifiable variables, and operator-modifiable delivery settings, wherein said operator-modifiable delivery settings comprise at least two of:

i. a particular announcement destination among a plurality of possible announcement destinations;

ii. a frequency of broadcasting an announcement;

iii. a time for broadcasting an announcement, iv. length of time between announcement play; and v. languages of announcement; and e. wherein at least one announcement of said plurality of announcements is defined by said at least one announcement template.

10. The courtesy announcement system of claim 9, wherein said operator workstation comprises a personal computer having a web-based graphical user interface.

11. The courtesy announcement system of claim 9, wherein said central networked announcement database server is comprised of an extensible markup language output for transmitting announcements for display on a video system.

12. The courtesy announcement system of claim 9, wherein said modifiable delivery settings are comprised of announcement destination, frequency of announcement, time of announcement, length of time between announcement play, start time of announcement, and languages of announcement.

13. The courtesy announcement system of claim 9, further comprised of a microphone connected to said at least one operator workstation on said network for vocally recording said announcement.

14. The courtesy announcement system of claim 9, wherein said central networked announcement database server is comprised of a text-to-speech converter.

15. The courtesy announcement system of claim 9, wherein said announcement template is further comprised of a batch message option for batching and broadcasting identical announcements for a plurality of recipients.

16. In a courtesy announcement system, a method for broadcasting announcements comprising the steps of:

a. providing a plurality of operator workstations operable to access an announcement system database server networked to said plurality of operator workstations;

b. receiving via a particular operator workstation of said plurality of said operator workstations:

1. a request for an operator-editable announcement template at said one of said plurality of operator workstations; together with 2. information responsive to said announcement template, whereby an announcement is constructed;

c. storing said announcement in an announcement log in said networked announcement system database server wherein said announcement log comprises an operator-accessible, editable, and re-playable record of a plurality of said announcements wherein said replayable record enables replaying at least one previously broadcast announcement; and d. broadcasting to at least one operator-selected destination said announcement stored in said networked announcement system database server as defined by said announcement template.

17. The method of claim 16, wherein said announcement template is comprised of commonly used phrases in multiple languages.

18. The method of claim 16, wherein the step of entering a request into said announcement template further includes selecting a courtesy announcement.

19. The method of claim 16, wherein the step of entering a request into said announcement template further includes selecting announcement content, said announcement content comprised of a message, modifiable variables, and modifiable delivery settings.

20. The method of claim 19, wherein said delivery settings are comprised of an announcement destination, announcement frequency, announcement start time, and broadcast zone.

21. The method of claim 16, further including the step of selecting an announcement type before the step of broadcasting said announcement.

22. The method of claim 21, wherein said announcement type is a voice recorded announcement.

23. The method of claim 21, wherein said announcement type is a text-to-speech announcement.

24. The method of claim 16, further including the step of accessing, reviewing, modifying, and broadcasting said announcements stored in said announcement log.

25. The method of claim 16, wherein said request for said announcement is a request for a new announcement.

26. The method of claim 16, wherein said request for said announcement is a request to replay said announcement.

27. The method of claim 16, wherein the step of broadcasting comprises the step of playing said message on audio reproduction devices and visual displays simultaneously and in synchronization.

28. The method of claim 16, further including the step of accessing said announcement from a list of pending announcements, wherein said announcement is optionally replayed, modified and replayed, or a private message as stated in said announcement template is transmitted to an intended recipient.

29. In a courtesy announcement system, a method for broadcasting announcements comprising the steps of:
   a. receiving an announcement request at an operator workstation connected to an announcement system database server, said announcement system database server including an announcement log;
   b. determining if said announcement request is a request for a new announcement;
      1. if so, proceeding to step c;
      2. if not, proceeding to step f;
   c. selecting a type of announcement from a plurality of announcement templates;
   d. selecting announcement content and announcement delivery settings for an announcement;
   e. recording said announcement in said announcement log, and proceeding to step n;
   f. determining if said announcement request is a request to replay a previously entered announcement;
      1. if so, proceeding to step g;
      2. if not, proceeding to step j;
   g. locating said previously entered announcement in said announcement log;
   h. selecting to replay said previously entered announcement;
   i. recording said previously entered announcement in said announcement log, and proceeding to step n;
   j. determining if said announcement request is a request by a recipient to retrieve an announcement intended for said recipient;
      1. if so, proceeding to step k;
      2. if not, proceeding to step 0;
   k. locating said announcement intended for said recipient in said announcement log;
   l. transmitting announcement content of said announcement intended for said recipient to said recipient;
   m. indicating said announcement intended for said recipient as delivered, and proceeding to step o.
   n. automatically broadcasting said announcement based on said announcement delivery settings;
   o. end method.

30. The method of claim 29, wherein step h further comprises modifying announcement content or announcement delivery settings of said previously entered announcement.

* * * * *